(12) United States Patent
Wazana et al.

(10) Patent No.: US 9,146,533 B2
(45) Date of Patent: Sep. 29, 2015

(54) PROCESS FOR INSTALLING ORIGINAL DRIVE GEAR ON A LASER PRINTER TONER CARTRIDGE DRUM

(75) Inventors: Yoel Wazana, Chatsworth, CA (US); Sagie Shanun, Valley Village, CA (US); Varuzhan Srmabekian, Northridge, CA (US)

(73) Assignee: CLOVER TECHNOLOGIES GROUP, LLC, Ottawa, IL (US)

( * ) Notice: Subject to any disclaimer, the term of this patent is extended or adjusted under 35 U.S.C. 154(b) by 743 days.

(21) Appl. No.: 13/079,780

(22) Filed: Apr. 4, 2011

(65) Prior Publication Data

US 2012/0247267 A1  Oct. 4, 2012

(51) Int. Cl.
*B23P 6/00* (2006.01)
*B23P 19/00* (2006.01)
*G03G 21/18* (2006.01)
*F16H 57/00* (2012.01)

(52) U.S. Cl.
CPC .......... *G03G 21/186* (2013.01); *F16H 57/0025* (2013.01); *Y10T 29/49462* (2015.01); *Y10T 29/53* (2015.01); *Y10T 74/19* (2015.01)

(58) Field of Classification Search
USPC .................... 29/895.22, 895, 895.1–895.213, 29/895.23–895.33, 505, 510, 511, 515, 29/516, 700, 437, 402.01, 402.03, 402.04, 29/402.08; 492/47, 15; 399/110, 111, 167; 74/640; 285/382; 403/274, 332, 366, 403/375
See application file for complete search history.

(56) References Cited

U.S. PATENT DOCUMENTS

| | | | | |
|---|---|---|---|---|
| 1,092,464 | A * | 4/1914 | Watson et al. | 384/565 |
| 5,765,286 | A * | 6/1998 | Sato et al. | 29/895.1 |
| 6,440,048 | B1 * | 8/2002 | Bleil et al. | 492/46 |
| 7,248,814 | B2 * | 7/2007 | Kawai et al. | 399/111 |
| 2009/0162093 | A1 * | 6/2009 | Shanun et al. | 399/109 |

* cited by examiner

*Primary Examiner* — Sarang Afzali

(57) ABSTRACT

A method is disclosed. The method provides an assembly that contains a first drum-cylinder having an inner periphery surface and a drive gear assembly, wherein a portion of the drive gear assembly is in contact with the inner periphery surface, separates the drive gear assembly from the first drum-cylinder, inserts the portion of the drive gear assembly into a second drum-cylinder, and couples the drive gear assembly to the second drum-cylinder.

10 Claims, 24 Drawing Sheets

PRIOR ART

PRIOR ART

PROCESS FOR INSTALLING ORIGINAL DRIVE GEAR ON A LASER PRINTER TONER CARTRIDGE DRUM

FIELD

The present invention relates generally to the field of laser printer toner cartridges and more specifically to the field of remanufacturing such cartridges.

BACKGROUND

A laser toner cartridge contains a few significant components that directly affect the print quality and durability over time. These significant components are all located in the development section of the cartridge. The above mentioned components are the photosensitive drum that is made of an electrically conducting material such as aluminum, the developing roller, the regulating member and the primary charge roller.

Referring to FIG. 1, as known in the art, a photosensitive drum assembly 20 also known in the art as Organic-Photo-Conductor (OPC) may include an aluminum cylinder, also known as drum-cylinder, 22 whose outer surface has been treated with anodizing and a photosensitive coating (not shown), a helical gear assembly 24 with helical teeth 26, and a helical drive gear assembly 28 with helical teeth 30.

As known in the art, during operation of a laser printer cartridge, the photosensitive drum assembly 20 rotates as its drive gear assembly 28 is rotated. Specific models of laser cartridges are known to have specific gear designs for the drive gear assembly 28. The drive gear assembly 28 is typically attached to the aluminum cylinder 22 by mechanical crimping and coupling process, such as, for example, described in U.S. Pat. No. 7,248,814. After some testing, it has been determined that an application of about 5 ft. lbs. of torque to the drive gear assembly 28 could cause the mechanical crimping and coupling process to fail and cause the photosensitive drum assembly 20 to separate from the drive gear assembly 28.

As a result of constant friction between the photosensitive drum assembly 20 and the primary charge roller (not shown), as well as friction between the developing roller (not shown), the printed media (not shown), and the cleaning member/wiper blade (not shown), the photo-conductive coating (not shown) on the aluminum cylinder 22 typically wears off and/or degrades as the laser cartridge is depleted. This wearing off and/or degradation of the coating (not shown) on the aluminum cylinder 22 may in turn reduce print quality of the laser cartridge when it is remanufactured. The amount of wear and/or degradation of the coating depends on multiple factors such as, for example: type of media printed, average coverage area of the printed documents, type of toner used, type of documents printed (short: 1-2 pages or long: 100+ pages), and/or type of coating etc. To improve print quality in the remanufactured cartridges, the aluminum cylinder 22 is typically treated as an exhausted component and is replaced by a new one during the remanufacturing processes.

While the aluminum cylinder 22 may become exhausted during a single lifecycle of the laser cartridge, the photosensitive drum assembly 20's drive gear assembly 28 typically does not degrade and/or wear out with such use, and may be re-used. In order to reduce costs of remanufacturing a laser toner cartridge and to improve print quality of the remanufactured laser cartridges, and to reduce waste a need exists for a process and associated apparatus by which the aluminum cylinder 22 with worn out/degraded coating is replaced and the drive gear assembly 28 from the original laser toner cartridge is reused.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
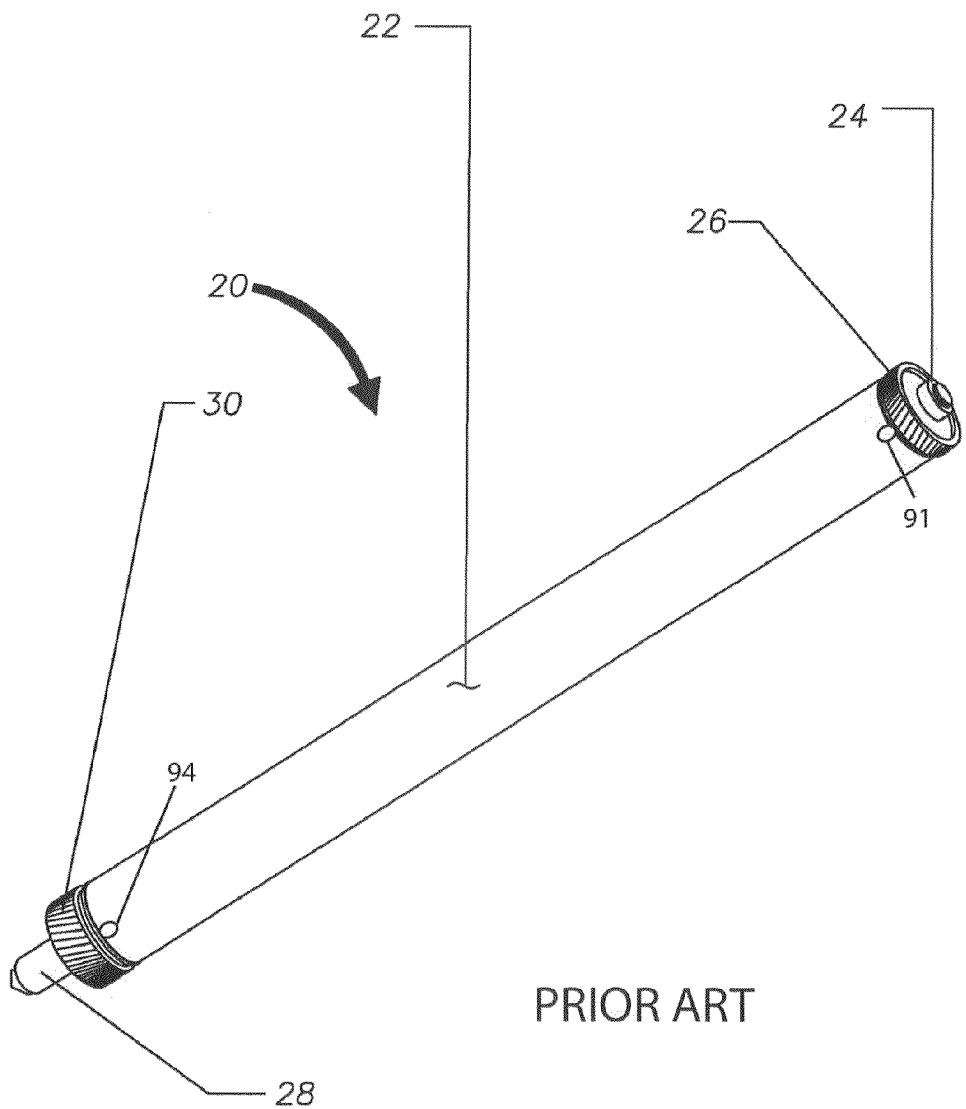
FIG. 1 depicts a perspective view of a prior art photosensitive member assembly.
Figure 2A:
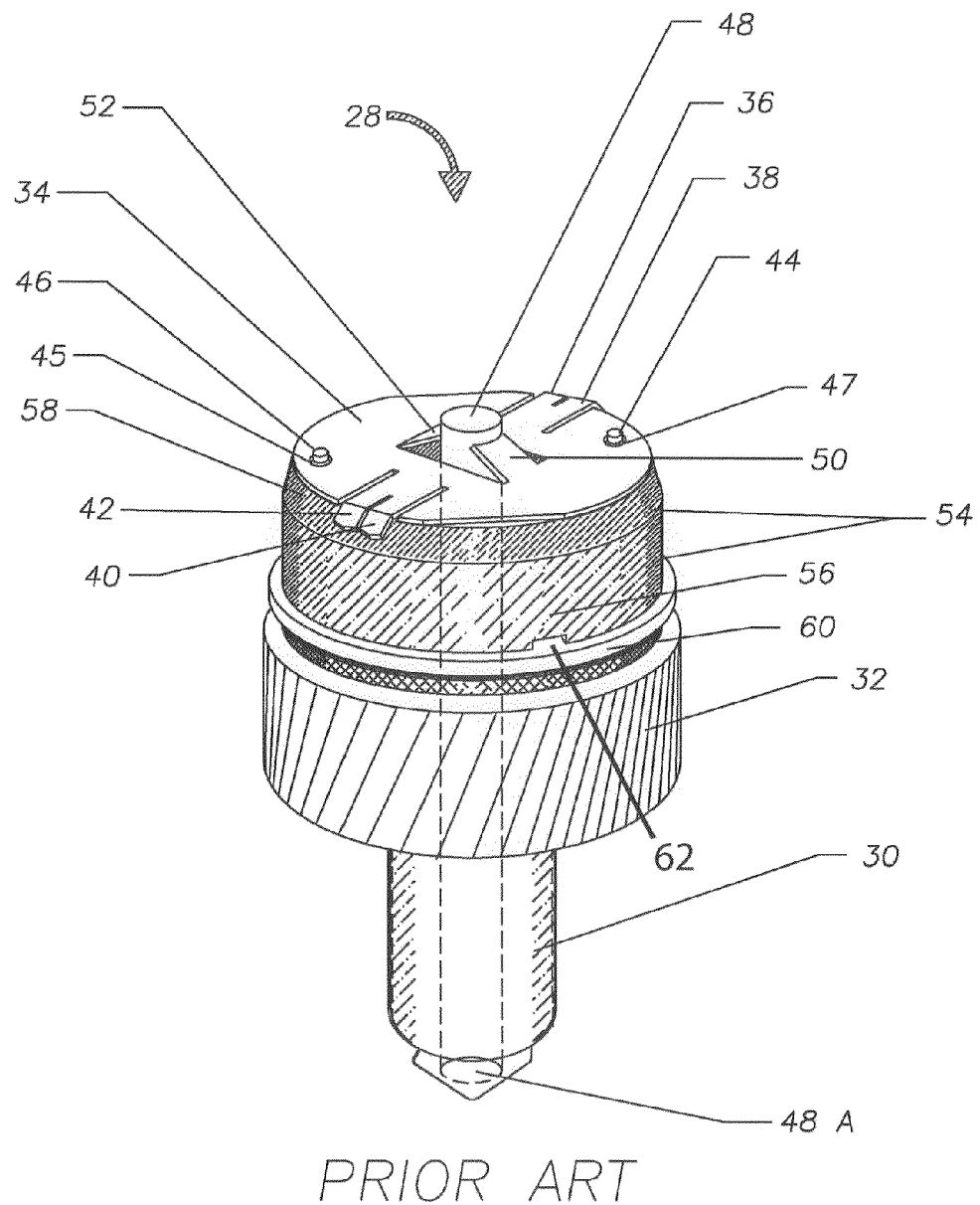
FIG. 2a depicts a perspective view of an exemplary prior art drive gear assembly.

Referring to FIG. 2a, as known in the art, a conventional drive gear assembly 28 may include a molded helical gear 30 with helical teeth 32 as well as a metal grounding contact plate 34 in the form, for example, of a disc. The grounding plate 34 may include two opposing pairs of parallel tabs with predetermined lengths as identified by reference numbers 36, 38, 40 and 42. The parallel tabs 36, 38, 40 and 42 may be cut from the periphery of the grounding contact plate 34. The tabs 36, 38, 40 and 42 may have an end portion that is slightly bent towards the helical teeth 32 of the helical gear 30. The tabs 36, 38, 40 and 42 may be used to create a conductive path for electrical continuity between the drum-cylinder 22 shown in FIG. 1, and the drum ground contact member 48. Grounding contact plate 34 may be positioned towards the helical molded gear 30 using, for example, two holes/openings 44, 46 that may be force-fitted on dowel plastic pins 45, 47 on the helical gear 30. The pins 45, 47 may be part of the drive gear assembly 28 and may be mushroomed (heat staked) over the grounding plate 34. The ground contact member 48 may provide a path to ground for the photosensitive drum assembly 20, shown in FIG. 1, through a contact on the toner cartridge (not shown) that is in turn grounded to the printing apparatus (not shown). The grounding member 48 may be pressure fitted into the grounding plate 34 and electrically connected to the plate 34 using, for example, two leaf spring contacts 50, 52. Although the present disclosure refers to a drive gear assembly 28 with a metal grounding contact plate 34, it is to be understood that the present invention may also be applied to drive gear assemblies 28 without any metal grounding contact plates 34.

Figure 3A:
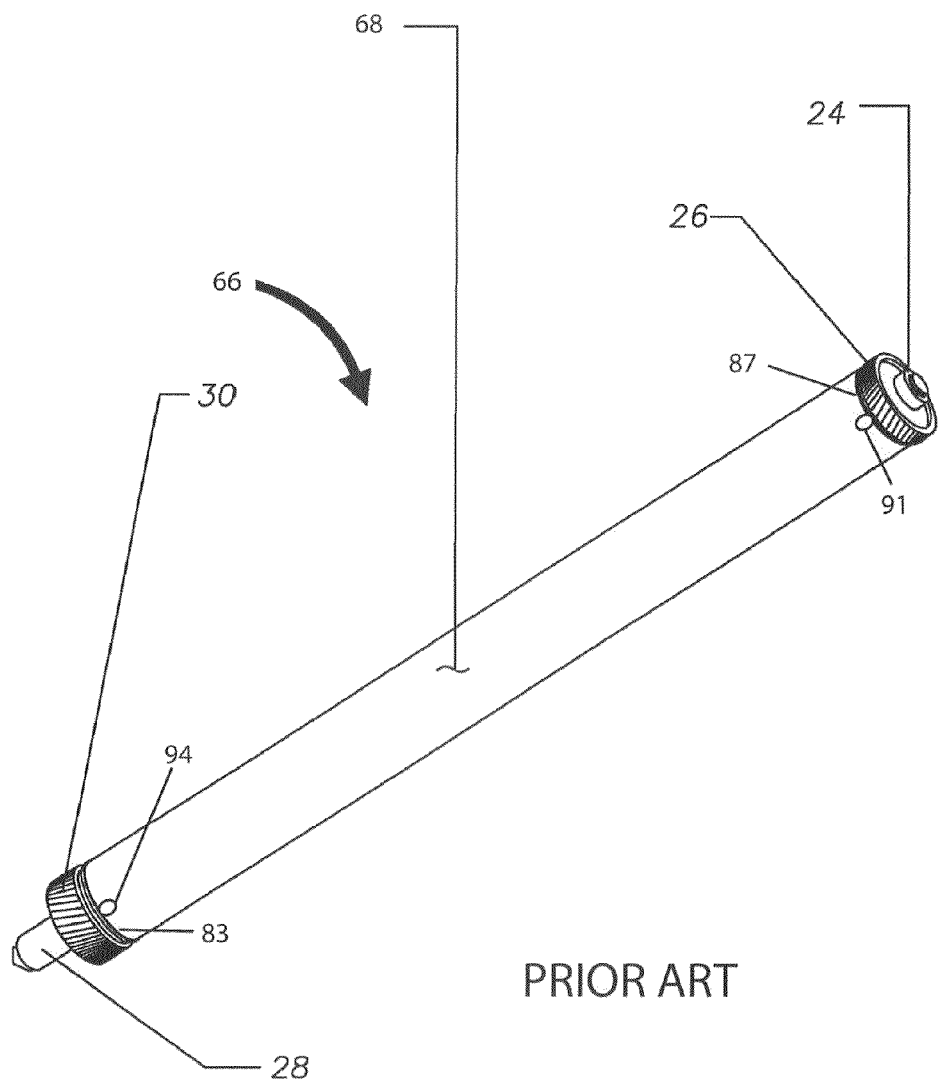
FIG. 3a depicts a perspective view of another prior art photosensitive member assembly.

The drive gear assembly 28 may also include surfaces 54. The surfaces 54 may include a gear flange 56 and a tapered area 58, as marked in the FIG. 2a by dashed lines. The tapered area 58 may be used to guide travel of the gear into the drum-cylinder 22 shown in FIG. 1 once it is inserted into the drum-cylinder 22. In the original photosensitive drum assembly 20, the drum-cylinder 22 may be crimped to the drive gear assembly 28 using one or more tabs 94 on the drum-cylinder 22 shown in FIG. 1. It is to be understood that another tab (not shown), similar to tab 94, may be located on the opposite side of the drum-cylinder 22. The one or more tabs 94 may be bent or made to fit into one or more slots 62 in the drive gear assembly 28, as shown in FIGS. 2a and 3d. It is to be understood that another slot (not shown), similar to slot 62, may be located on the opposite side of the drive gear assembly 28. A limiting rail 60, shown in FIG. 2a, may be used as a location guide when the drive gear assembly 28 is inserted into the drum-cylinder 22, as shown in FIG. 1.

Figure 2B:
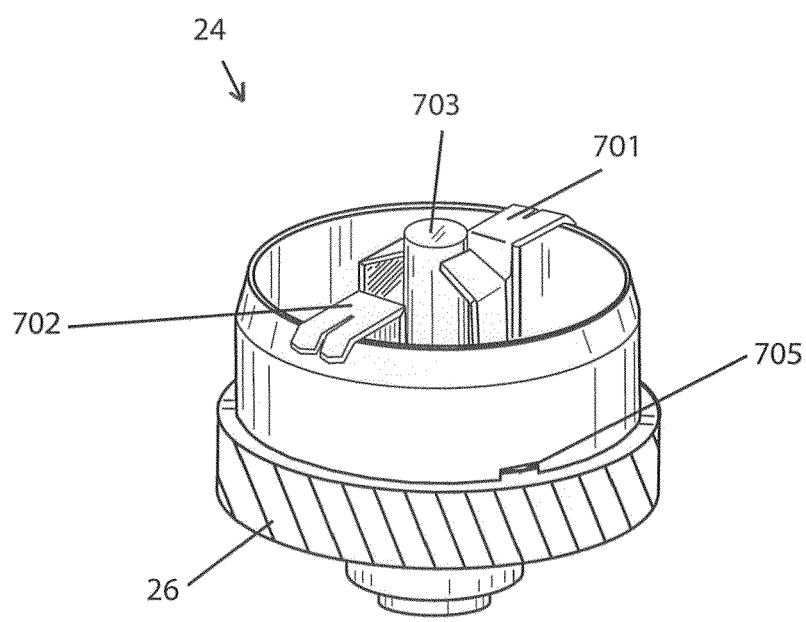
FIG. 2b depicts a perspective view of an exemplary prior art helical gear assembly.
Figure 2C:
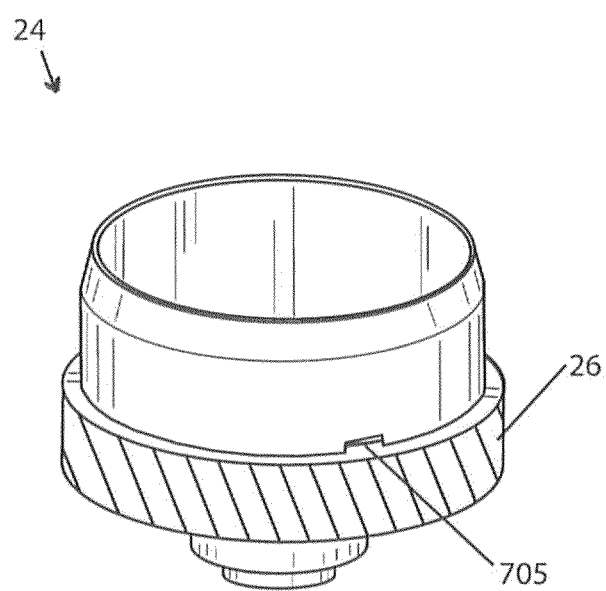
FIG. 2c depicts a perspective view of another exemplary prior art helical gear assembly.

Referring to FIGS. 2b-c, as known in the art, the helical gear assembly 24 may also be crimped to the drum-cylinder 22. The helical gear assembly 24 may comprise helical teeth 26, one or more openings/slots 705. The helical gear assembly 24 may also comprise grounding plates/tabs 701 and 702 as shown in FIG. 2b. The plates/tabs 701 and 702 may be used to create a conductive path for electrical continuity between the drum-cylinder 22 shown in FIG. 1, and the drum ground contact member 703. The ground contact member 703 may provide a path to ground for the photosensitive drum assembly 20, shown in FIG. 1, through a contact on the toner cartridge (not shown) that is in turn grounded to the printing apparatus (not shown). Although the present disclosure refers to the helical gear assembly 24 with grounding plates/tabs 701 and 702, it is to be understood that the present invention may also be applied to helical gear assemblies 28 without any grounding plates/tabs 701 and 702 as shown in FIG. 2c.

Similarly to the drive gear assembly 28 described above, in the original photosensitive drum assembly 20, the drum-cylinder 22 may be crimped to the helical gear assembly 24 using one or more tabs 91 on the drum-cylinder 22 as shown in FIG. 1. It is to be understood that another tab (not shown), similar to tab 91, may be located on the opposite side of the drum-cylinder 22. The one or more tabs 91 may be bent or made to fit into one or more slots 705 in the helical gear assembly 24.

Referring to FIGS. 3a-f and 4a-b, exemplary processes for removing the original drive gear assembly 28 and the original helical gear assembly 24 from a photosensitive drum assembly 66 are disclosed.

Figure 3B:
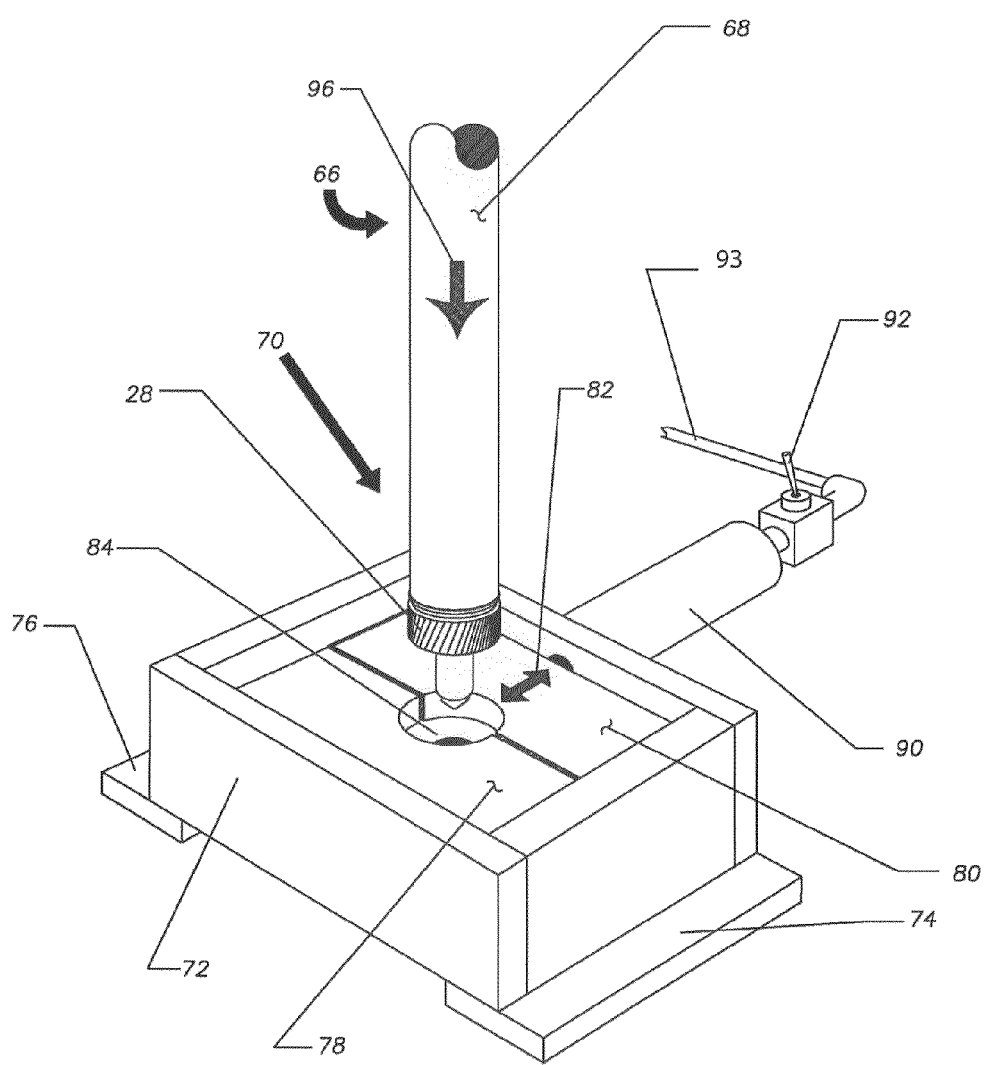
FIGS. 3b-c depict a perspective view of an exemplary apparatus according to the present disclosure for removing the drive gear assembly gear from the original photosensitive member assembly.
Figure 3C:
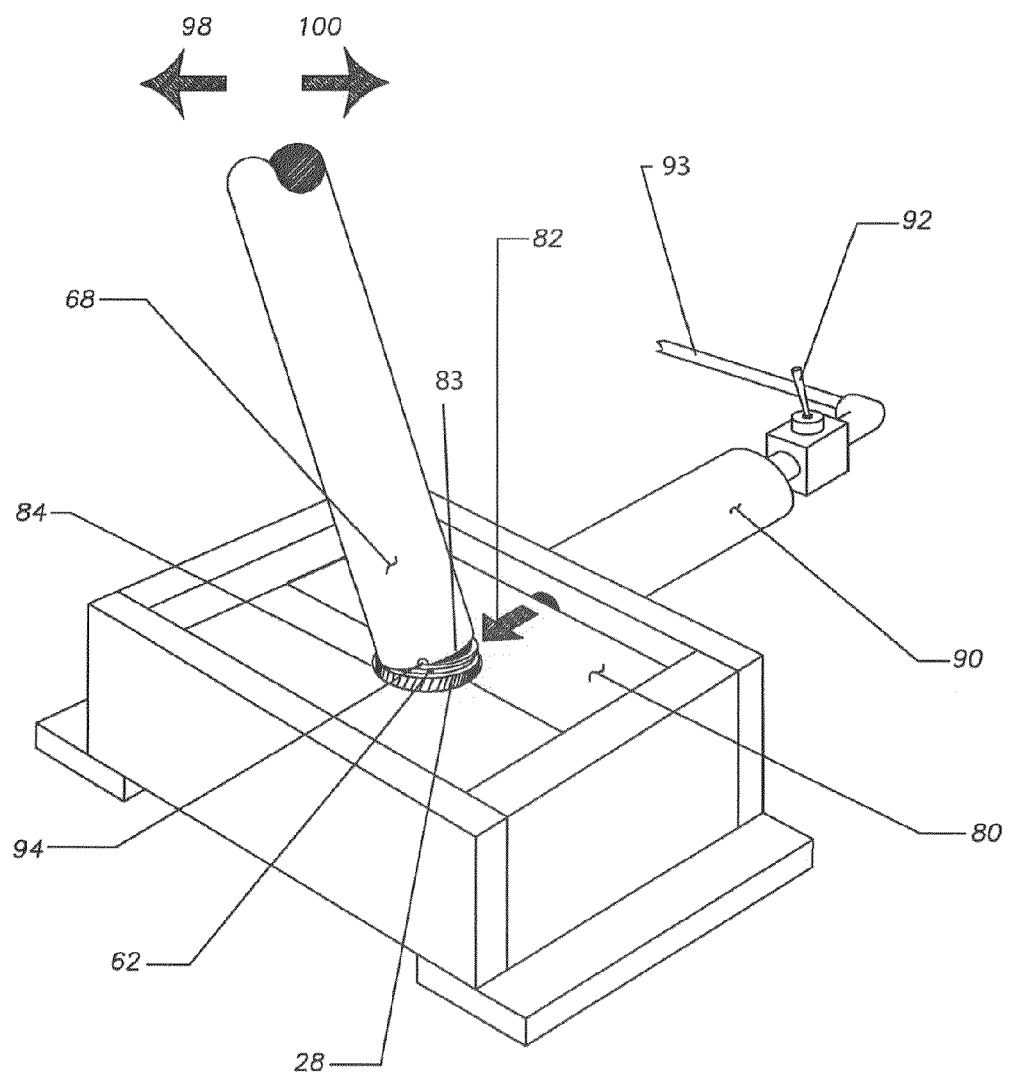
Figure 3D:
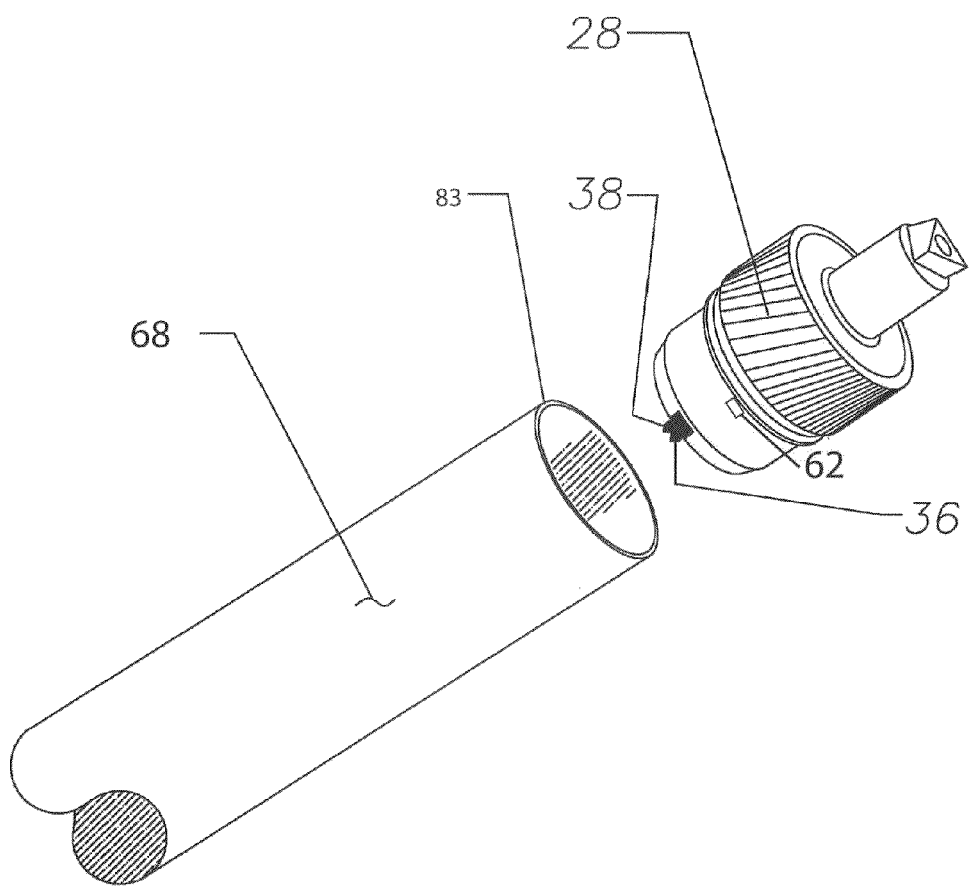
FIG. 3d depicts a perspective view of the drive gear assembly separated from the photosensitive member assembly.

Referring to FIGS. 3b-d, an exemplary process for removing the original drive gear assembly 28 from a drum-cylinder 68 using a pneumatic clamp apparatus 70 will be described. The pneumatic clamp apparatus 70 may comprise clamp housing positioning legs 74, 76; a base or housing, one wall of which is shown at 72; a stationary grip 78; and a sliding grip 80. The sliding grip 80 may slide back and forth in the directions of the arrow 82 and may have two positions "open" and "close". Once the sliding grip 80 is in the open position, as shown in FIG. 3b, the drive gear assembly 28 is inserted into sleeve 84 in order to hold it in position. A pneumatic air cylinder 90 drives the sliding grip 80 in the directions of the arrow 82 to open and close the clamp. The apparatus 70 may also include an air switch 92 that has two positions "open" and "close", and a compressed air delivery hose 93. In order to operate the apparatus 70 and to insert the drive gear assembly 28, the switch 92 has to be on "open" mode. The drive gear assembly 28 is then vertically inserted into the sleeve 84 in the direction of arrow 96.

Referring to FIG. 3c, once the drive gear assembly 28 is in the sleeve 84, the switch 92 is then actuated or pushed to the "close" position (not shown) and the sliding grip 80 clamps the drive gear assembly 28 in a fixed position as shown in FIG. 3b. Then the drum-cylinder 68 may be rocked back and forth in the directions of the arrows 98, 100 in order to break the connection between the crimping tab 94 and the slot 62 thus releasing the drive gear assembly 28 from the drum-cylinder 68. Referring to FIG. 3d, once the drive gear assembly 28 is released from the drum-cylinder 68, the drum-cylinder 68 will have an open/exposed end 83.

Figure 3E:
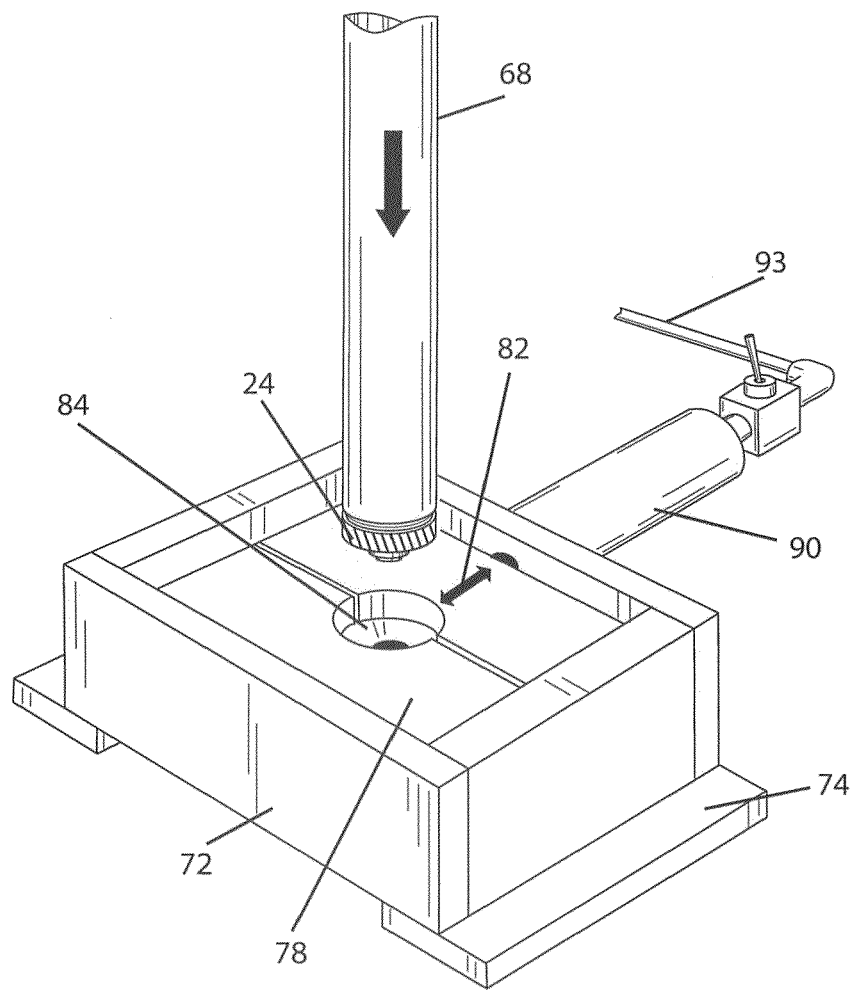
FIG. 3e depicts a perspective view of an exemplary apparatus according to the present disclosure for removing the helical gear assembly gear from the original photosensitive member assembly.
Figure 3F:
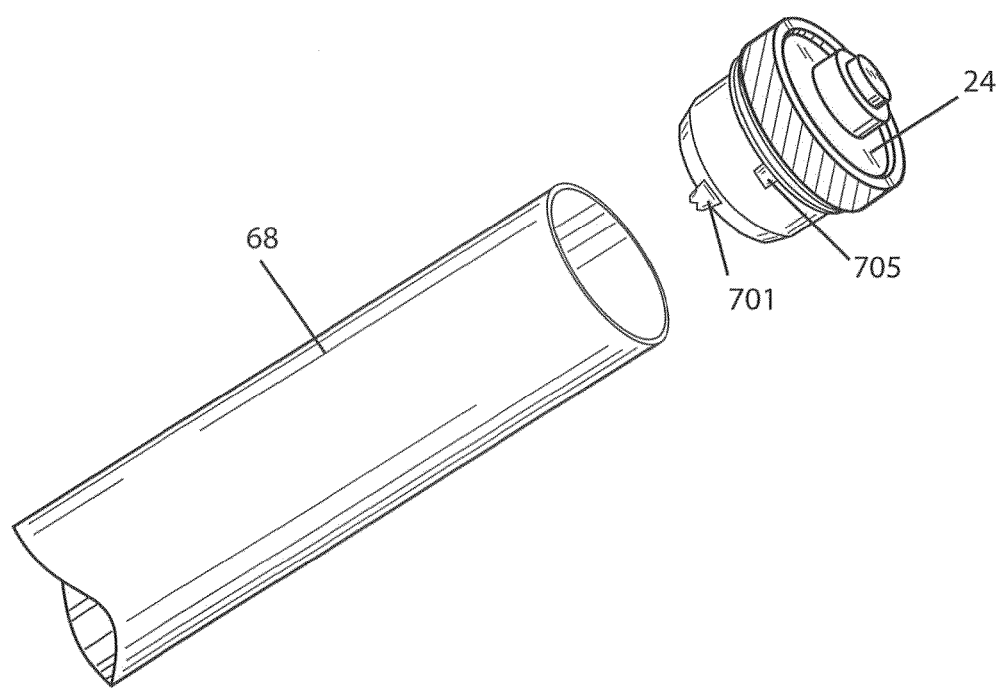
FIG. 3f depicts a perspective view of the helical gear assembly separated from the photosensitive member assembly.

Although the pneumatic clamp apparatus 70 may also be used to remove the helical gear assembly 24 from the drum-cylinder 68 as shown in FIGS. 3e-f, the sliding grip 80 and the stationary grip 78 may damage the helical teeth 26 that are around the perimeter of the helical gear assembly 24. An exemplary process of removing the original helical gear assembly 24 from a drum-cylinder 68 without damaging the helical teeth 26 according to the present disclosure is disclosed with reference to FIGS. 4a-b.

Figure 4A:
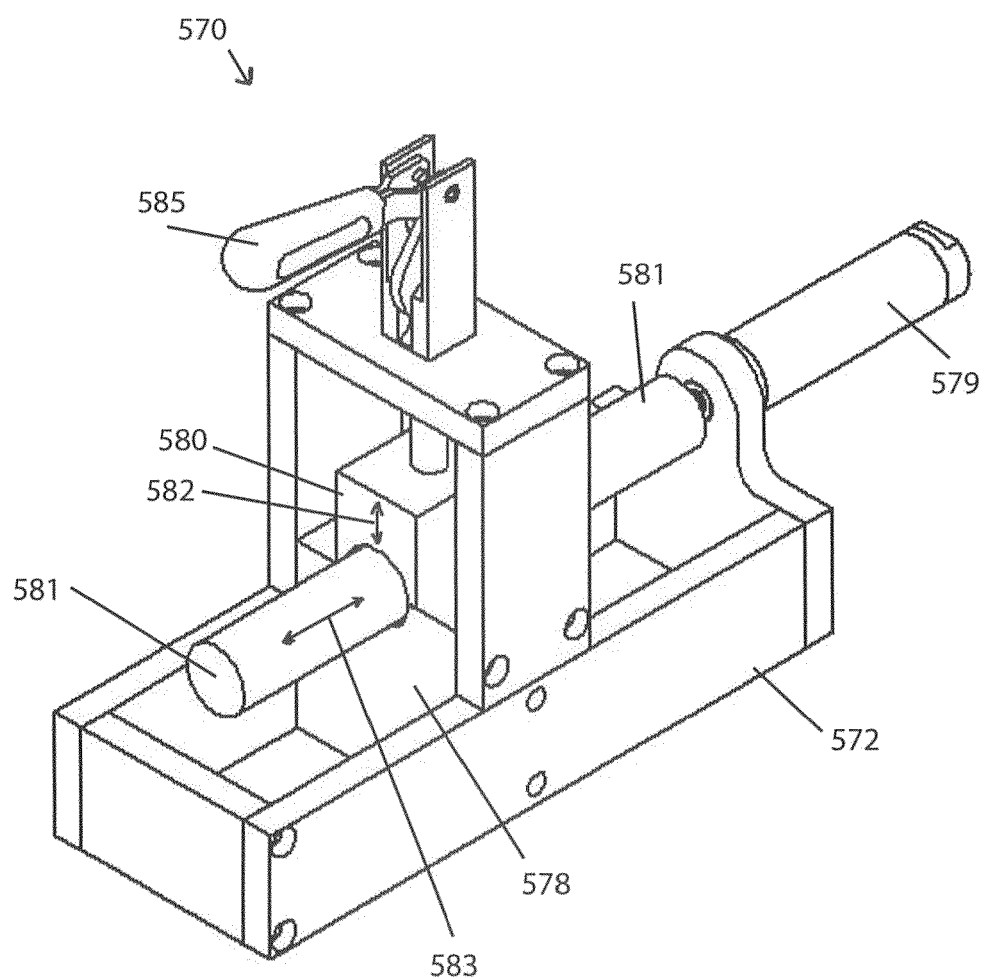
FIGS. 4a-b depict a perspective view of another exemplary apparatus according to the present disclosure for removing the helical gear assembly gear from the original photosensitive member assembly.
Figure 4B:
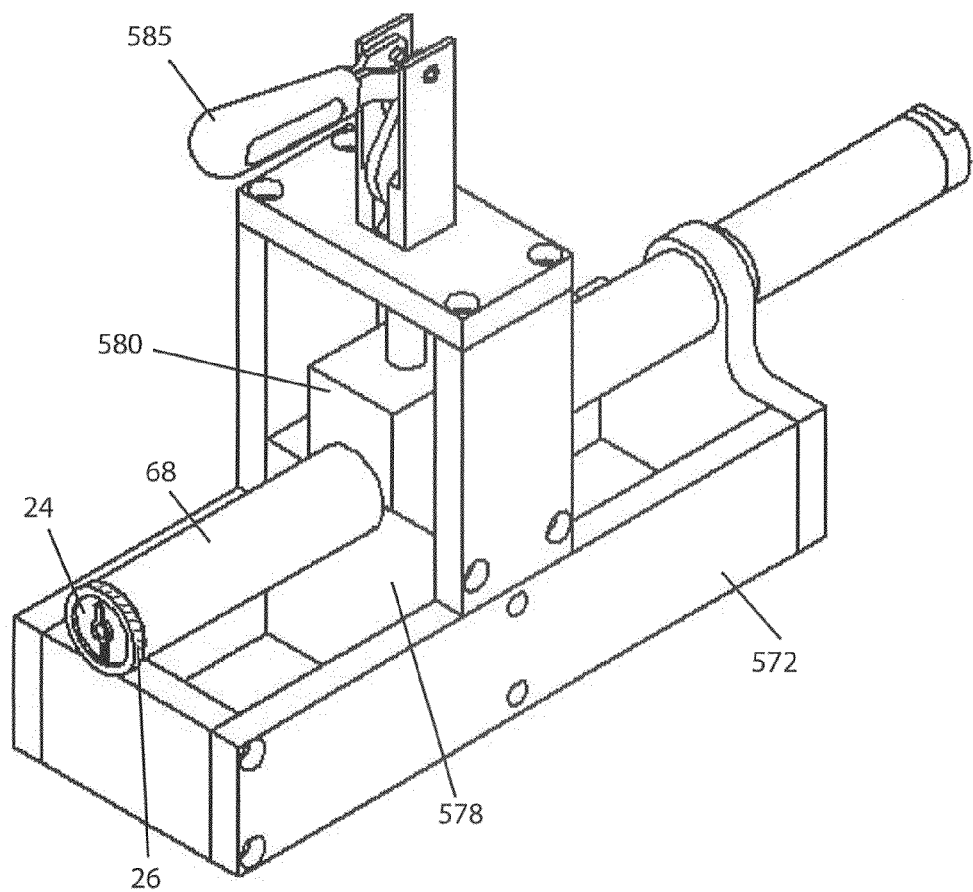

Referring to FIGS. 4a-b, an exemplary process for removing the original helical gear assembly 24 from a drum-cylinder 68 using a pneumatic piston apparatus 570 will be described. The pneumatic piston apparatus 570 may comprise a frame 572; a sliding rod 581. The sliding rod 581 may slide back and forth in the direction of the arrow 583 and may have two positions "retract" and "extend". The pneumatic piston apparatus 570 may also comprise a stationary grip 578 and a moving grip 580. The moving grip 580 may move up and down in the directions of the arrow 582 by raising or lowering of a lever 585. The moving grip 580 may have two positions "open" and "close". When the lever 585 is raised, the moving grip 580 is in the "open" position and when the lever 585 is lowered, the moving grip 580 is in the "closed" position.

When the sliding grip 580 is in the "open" position and the sliding rod 581 is in the "retracted" position, the open/exposed end 83 of the drum-cylinder 68 slides onto the sliding rod 581 towards the moving grip 580. Once the drum-cylinder 68 is on the sliding rod 581, it is locked in place between the moving grip 580 and the stationary grip 578 by lowering the lever 585 and causing the moving grip 580 to be in the "closed" position. Once the drum-cylinder 68 is locked in place between the moving grip 580 and the stationary grip 578, the sliding rod 581 may be activated to slide into the "extend" position to push against the helical gear assembly 24 and break the connection between the one or more tabs 91 shown in FIG. 3a and the slot (not shown) that may be in the helical gear assembly 24 thus releasing the helical gear assembly 24 from the drum-cylinder 68. Referring to FIG. 3a, once the helical gear assembly 24 is released from the drum-cylinder 68, the drum-cylinder 68 will have an open/exposed end 87.

In one exemplary embodiment, the sliding rod 581 may be activated to slide into the "extend" position by activating air switch (not shown) and supplying compressed air through a hose (not shown) to an air piston 579.

In another exemplary embodiment according to the present disclosure, the pneumatic piston apparatus 570 may also be used to release the drive gear assembly 28 from the drum-cylinder 68 after the helical gear assembly 24 has been released from the drum-cylinder 68 using, for example, the pneumatic clamp apparatus 70. In another exemplary embodiment according to the present disclosure, the pneumatic piston apparatus 570 may be used to release the drive gear assembly 28 and the helical gear assembly 24 from the drum-cylinder 68 by cutting the drum-cylinder 68 in half using saws known in the art.

Although the present disclosure refers to a helical gear assembly 24 shown in FIG. 1, helical gear assemblies 24 are manufactured in different shapes and sizes and may not have helical teeth 26. The embodiment presently disclosed may be applied to helical gear assemblies 24 irrespective of size, shape and/or with or without helical teeth 26.

Figure 5A:
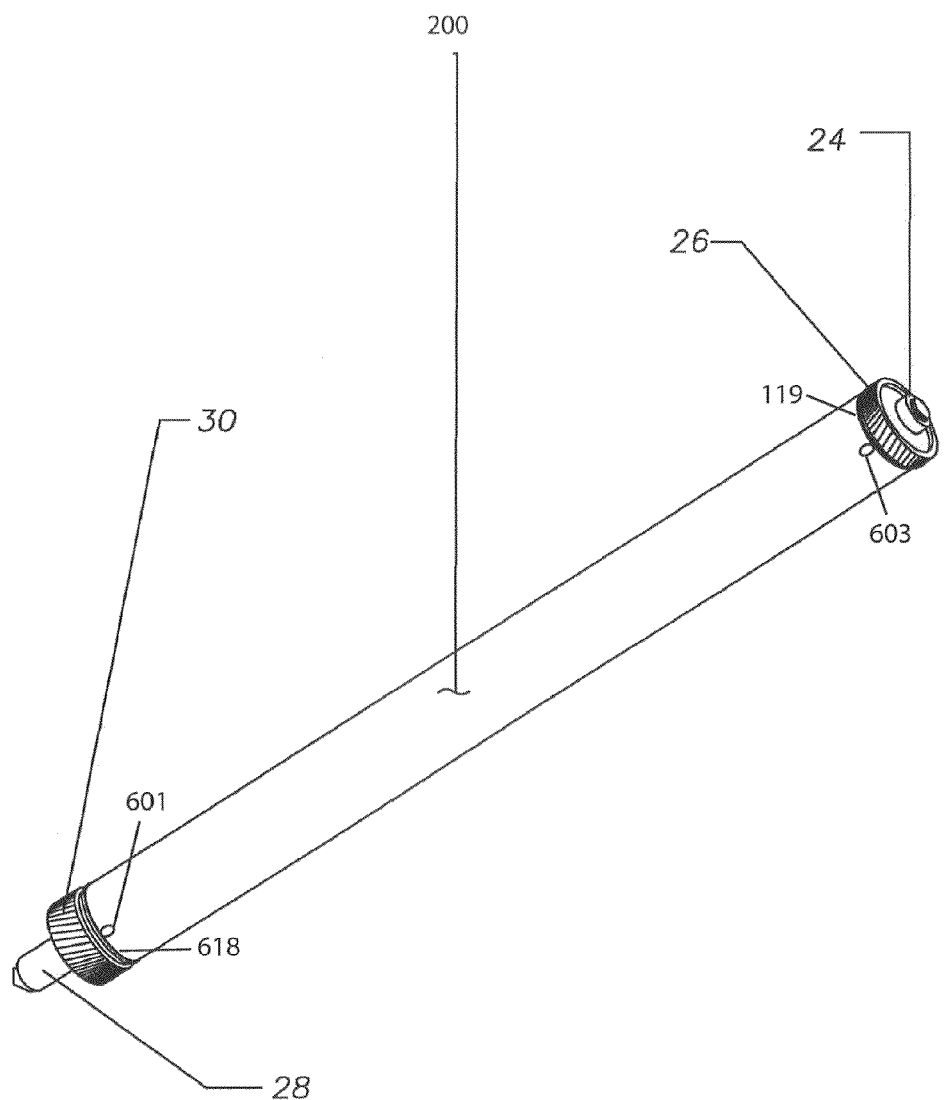
FIG. 5a depicts a perspective view of with the helical gear assembly and the drive gear assembly coupled to a new photosensitive member assembly.

Once the helical gear assembly 24 and the drive gear assembly 28 are released from the drum-cylinder 68 as shown in FIGS. 3d and 3f, the drum-cylinder 68 may be recycled or discarded while the drive gear assembly 28 and/or the helical gear assembly 24 may be re-used with a new drum-cylinder 200 as shown in FIG. 5a.

Figure 5B:
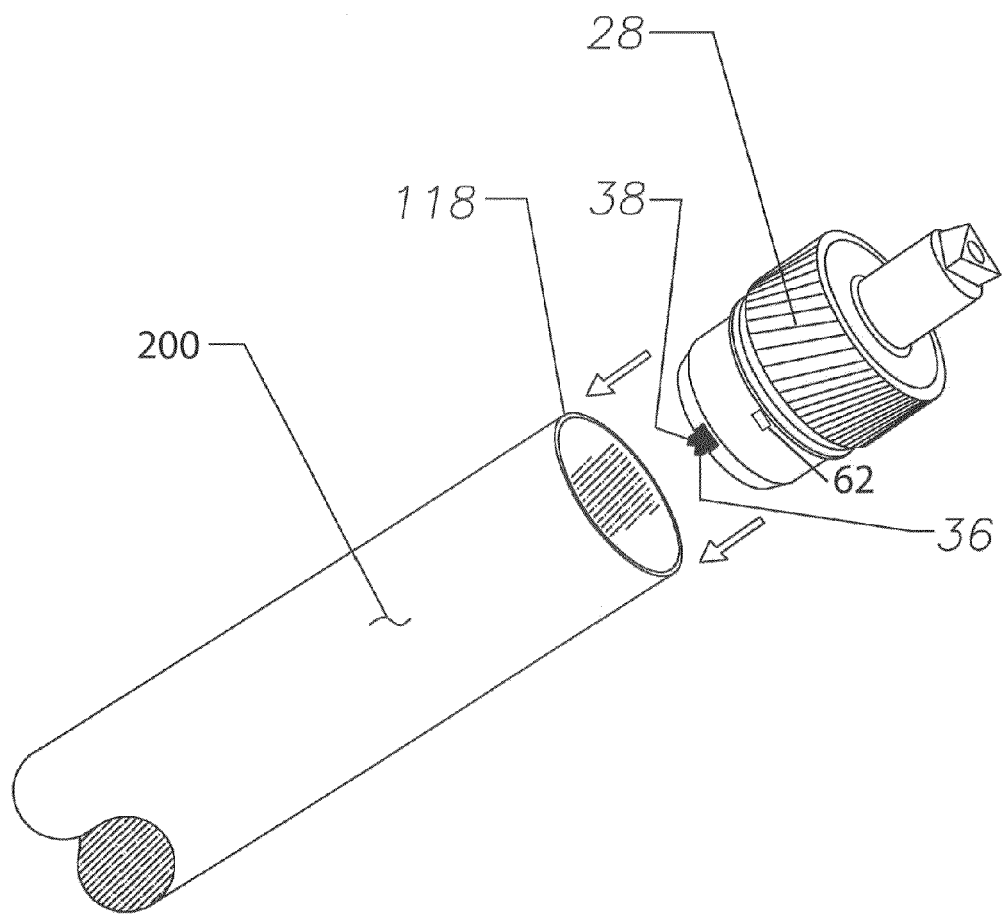
FIG. 5b depicts a perspective view of the orientation of the drive gear assembly and the drum-cylinder before installation.

Referring to FIG. 5a-b, in one exemplary embodiment according to the present disclosure, the drive gear assembly 28 may be recycled after being removed from the drum-cylinder 68 by being coupled with a new drum-cylinder 200. To couple the drive gear assembly 28 with the new drum-cylinder 200, the drive gear assembly 28 may be positioned adjacent the end 118 of the drum-cylinder 200 so as to facilitate electrical contact between the tabs 36, 38 and the inner surface of the drum-cylinder 200. Once properly aligned, at least a portion of the drive gear 28 may be inserted into the first end 118 of the new drum-cylinder 200. In one exemplary embodiment, the drive gear assembly 28 may be inserted into the first end 118 of the new drum-cylinder 200 until the edge of the first end 118 abuts the limiting rail 60 and the tabs 36, 38 are in electrical contact with the inner surface of the new drum-cylinder 200. Once the drive gear assembly 28 is inserted into the first end 118 of the new drum-cylinder 200, a portion of the new drum-cylinder 200 may be crimped/bent 601 into the slot 62 of the drive gear assembly 28 to prevent the drive gear assembly 28 from being separated from the new drum-cylinder 200 as the drive gear assembly 28 rotates the new drum-cylinder 200. Although the present disclosure refers to a drive gear assembly 28 with a metal grounding contact plate 34 and tabs 36, 38, 40, 42, it is to be understood that the present invention may also be applied to drive gear assemblies 28 without the metal grounding contact plates 34 and tabs 36, 38, 40, 42.

Figure 5C:
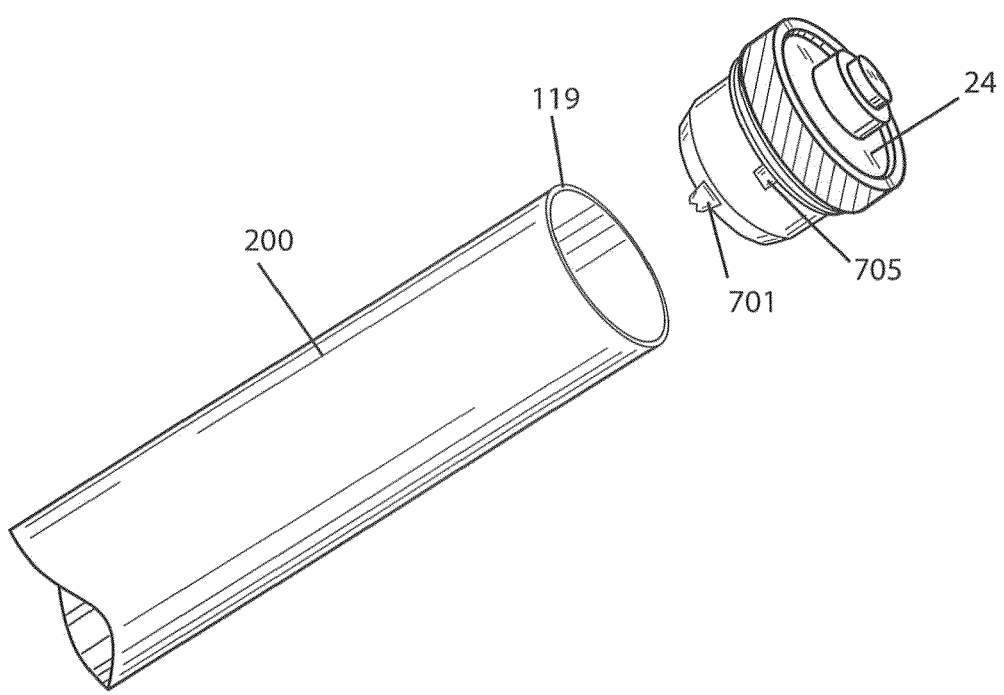
FIG. 5c depicts a perspective view of the orientation of the helical gear assembly and the drum-cylinder before installation.

Referring to FIGS. 5a and 5c, in one exemplary embodiment according to the present disclosure, the helical gear assembly 24 may be recycled after being removed from the drum-cylinder 68 by being coupled with a new drum-cylinder 200. To couple the helical gear assembly 24 with the new drum-cylinder 200, the helical gear assembly 28 may be positioned adjacent the end 119 of the drum-cylinder 200 so as to facilitate electrical contact between the tabs 701, 702 and the inner surface of the drum-cylinder 200. Once properly aligned, at least a portion of the helical gear assembly 24 may be inserted into the second end 119 of the new drum-cylinder 200. In one exemplary embodiment, the helical gear assembly 24 may be inserted into the second end 119 of the new drum-cylinder 200 until the tabs 701, 702 are in electrical contact with the inner surface of the new drum-cylinder 200. Once the helical gear assembly 24 is inserted into the second end 119 of the new drum-cylinder 200, a portion of the new drum-cylinder 200 may be crimped/bent 603 into the slot 705 of the helical gear assembly 24 to prevent the helical gear assembly 24 from being separated from the new drum-cylinder 200. Although the present disclosure refers to a helical gear assembly 24 with a metal grounding contact plate/tabs 701, 702, it is to be understood that the present invention may also be applied to helical gear assemblies 24 without the metal grounding contact plates/tabs 701, 702 as shown in FIG. 2c.

In one exemplary embodiment according to the present disclosure, the drive gear assembly 28 may be inserted into the first end 118 of the new drum-cylinder 200 manually by hand. Similarly, the helical gear assembly 24 may be inserted into the second end 119 of the new drum-cylinder 200 manually by hand. In another exemplary embodiment according to the present disclosure, the drive gear assembly 28 and the helical gear assembly 24 may be inserted into the new drum-cylinder 200 using any apparatus as known in the art.

Figure 6A:
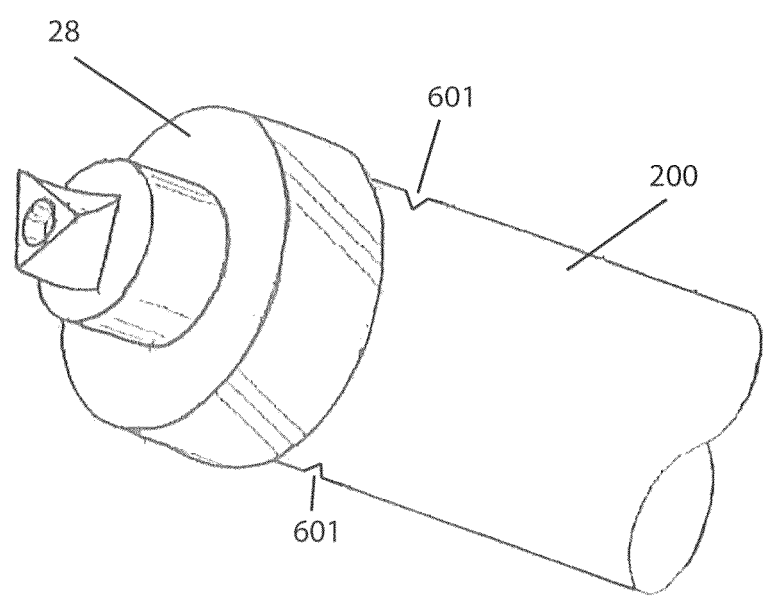
FIG. 6a depicts an exemplary embodiment of coupling the drive gear assembly and the new drum-cylinder.

Referring to FIG. 6a, once the drive gear assembly 28 is inserted into the new drum-cylinder 200, a portion of the new drum-cylinder 200 may be crimped/bent 601 on one or more sides to prevent the drive gear assembly 28 from being released from the new drum-cylinder 200 as the drive gear assembly 28 rotates the new drum-cylinder 200. In one exemplary embodiment, a portion of the new drum-cylinder 200 may be crimped/bent 601 into the one or more pre-existing slots 62 shown in FIGS. 2, 3d and 5b.

Figure 6B:
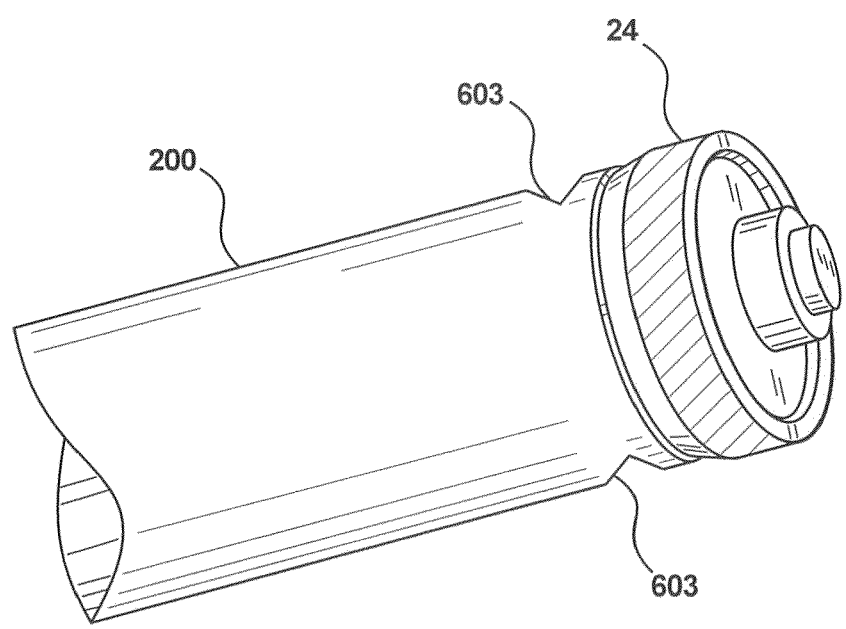
FIG. 6b depicts an exemplary embodiment of coupling the helical gear assembly and the new drum-cylinder.

Referring to FIG. 6b, once the helical gear assembly 24 is inserted into the new drum-cylinder 200, a portion of the new drum-cylinder 200 may be crimped/bent 603 on one or more sides to prevent the helical gear assembly 24 from being released from the new drum-cylinder 200. In one exemplary embodiment, a portion of the new drum-cylinder 200 may be crimped/bent 603 into the one or more pre-existing slots 705 shown in FIGS. 2b-c and 3f.

The new drum-cylinder 200 may be crimped/bent 601, 603 using hand tools or crimping presses as known in the art. In one exemplary embodiment according to the present disclosure, the force required to release the drive gear assembly 28 or the helical gear assembly 24 from the new drum-cylinder 200 may be about 5 ft. lbs. of torque or more.

In one exemplary embodiment according to the present disclosure, the new drum-cylinder 200 may be crimped/bent 601, 603 using crimping apparatus 610 shown in FIGS. 7a-c and 8.

Figures 7A, 7B:
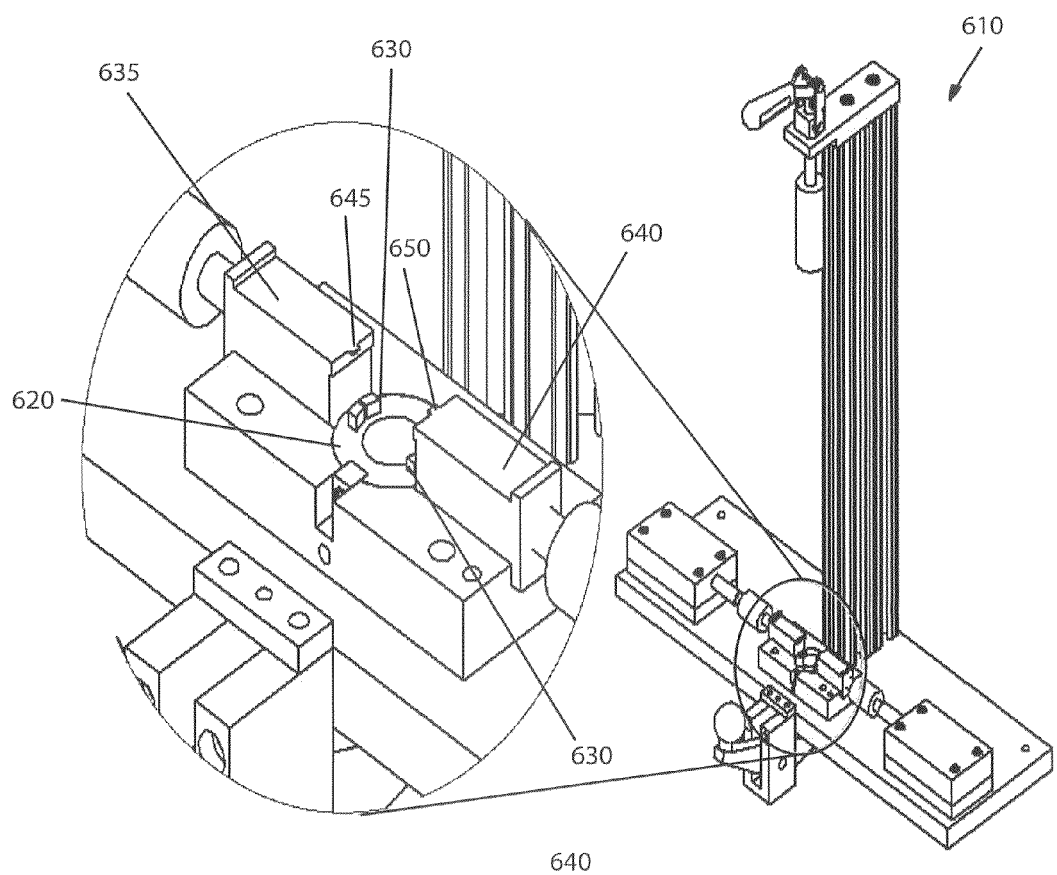
FIGS. 7a-c and 8 depict a perspective view of an exemplary apparatus according to the present disclosure for coupling the drive gear assembly to a new photosensitive member assembly.
Figure 7C:
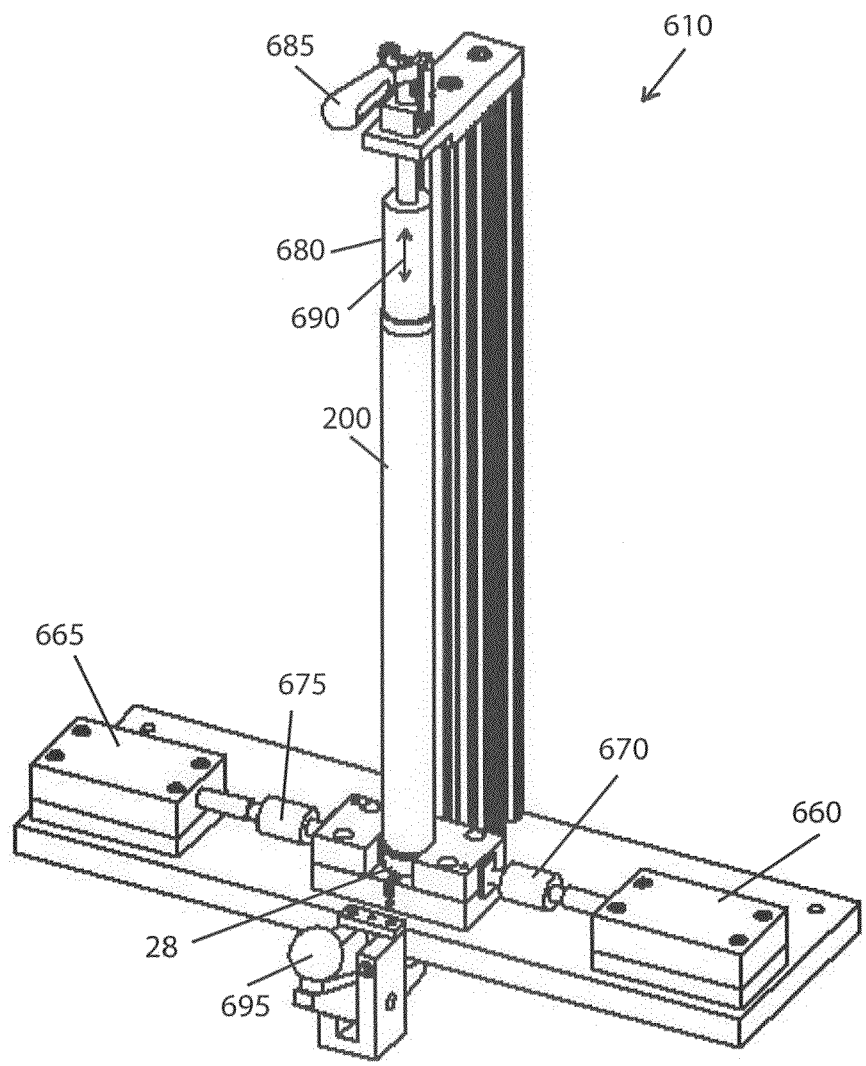
Figure 8:
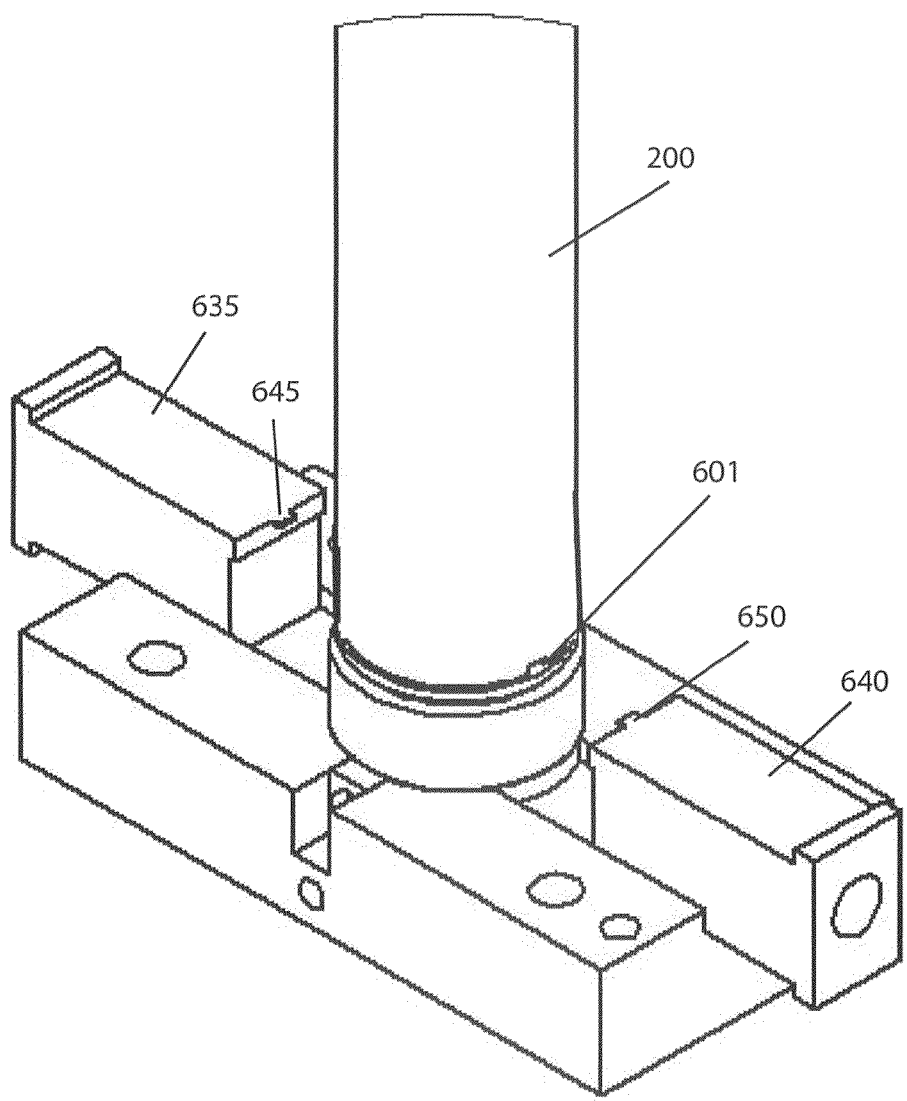

Referring to FIGS. 7a-c and 8, an exemplary process according to the present disclosure for coupling the original drive gear assembly 28 to the new drum-cylinder 200 using the crimping apparatus 610 will be described. Referring to FIG. 7b, the crimping apparatus 610 may comprise a holding plate 620 configured to hold a portion of the original drive gear assembly 28; an opening 615 for accommodating the holding plate 620 and accommodating at least a portion of the original drive gear assembly 28 during the coupling process. Because the drive gear assemblies 28 are manufactured in different shapes and sizes, the opening 615 may be configured to accommodate different holding plates 620, wherein each holding plate 620 may be designed to hold/accommodate a specific model and/or shape of the drive gear assembly 28. The holding plate 620 may also have one or more gear rails 630 configured to hold and/or guide the drive gear assembly 28 as it is being inserted into the holding plate 620 and/or as it is being coupled to the new drum-cylinder 200. Referring to FIGS. 7b and 8, the crimping apparatus 610 may also comprise movable arms 635 and 640 each comprising at least one crimping tooth 645 and 650. As the drive gear assembly 28 is placed into the holding plate 620 and the new drum-cylinder 200 is placed over, at least a portion of, the drive gear assembly 28, the movable arms 635 and 640 may be activated to move towards each other so that the crimping teeth 645 and 650 may crimp/bend 601 the drum-cylinder 200 thereby coupling the drum-cylinder 200 to the drive gear assembly 28. In one exemplary embodiment, the holding plate 620 may be configured to position the drive gear assembly 28 so as to allow the crimping teeth 645 and 650 to crimp/bend 601 the drum-cylinder 200 into the pre-existing opening/slots 62 as shown in FIG. 5b. In another exemplary embodiment the crimping teeth 645 and 650 may be made from hardened steel to prevent breakage.

As stated above, the drive gear assemblies 28 come in different shapes and sizes and may have different size opening/slots 62. In order to accommodate the different drive gear assemblies 28, in another exemplary embodiment, the crimping apparatus 610 may be configured to accommodate different movable arms 635 and 640 with different size/shape crimping teeth 645 and 650, wherein different movable arms 635 and 640 may be designed for a specific model and/or shape of the drive gear assembly 28 and/or opening/slots 62.

In another exemplary embodiment, the crimping apparatus 610 may use systems 660 and 665 to move the movable arms 635 and 640 towards and away from each other. In one exemplary embodiment, the systems 660 and 665 may be mechanical system, where the movable arms 635 and 640 are operated by a manual lever (not shown). In another exemplary embodiment, the systems 660 and 665 may be a compressed air system, where the movable arms 635 and 640 are moved with compressed air and/or air pistons 670, 675 as known in the art. In another exemplary embodiment, the systems 660 and 665 may be an electric system, where the movable arms 635 and 640 are moved with either motors (not shown) and/or electrical actuators (not shown) as known in the art.

Referring to FIG. 7c, the crimping apparatus 610 may also comprise a holding arm 680 capable of being raised or lowered in the direction of the arrow 690 with, for example, a lever 685. As the drive gear assembly 28 is placed into the holding plate 620 and the new drum-cylinder 200 is placed over, at least a portion of, the drive gear assembly 28, the holding arm 680 may be lowered to hold the drive gear assembly 28 and the drum-cylinder 200 in place during the crimping process. The holding arm 680 may be used to assure that the drum-cylinder 200 does not move and the drive gear assembly 28 is firmly in the holding plate during the crimping process.

Referring to FIG. 7c, the crimping apparatus 610 may also comprise a lever 695 configured to release the drive gear assembly 28 from the holding plate 620 by lowering and raising a drum (not shown) within the opening 615. By lowering the lever 695, the operator of the crimping apparatus 610 may raise the drum (not shown) within the opening 615 there by pushing the drive gear assembly 28 out of the holding plate 620.

Although FIGS. 7a-c depict the crimping apparatus 610 as having two movable arms 635 and 640, in another exemplary the crimping apparatus 610 may have more than two movable arms 635 and 640. The number of movable arms 635 and 640 would depend on the number of crimps/bends 601 required to provide sufficient coupling between the drum-cylinder 200 and the drive gear assembly 28.

In another exemplary embodiment, the crimping apparatus 610 may be configured to have and/or operate and/or move only one of the movable arms 635 and 640. In this embodiment, the crimping apparatus 610 would provide only one crimp/bend 601 for coupling the drum-cylinder 200 to the drive gear assembly 28.

Although FIGS. 7a-c and 8 depict and describe the process of coupling the original drive gear assembly 28 to the new drum-cylinder 200, in another exemplary embodiment according to the present application, the crimping apparatus 610 may also be use to couple the helical gear assembly 24 to the new drum-cylinder 200. In this embodiment, the crimping apparatus 610 may be configured with moving arms 635 and 640 and holding plate 620 that are configured to accommodate the helical gear assembly 24 instead of the drive gear assembly 28.

Figure 9A:
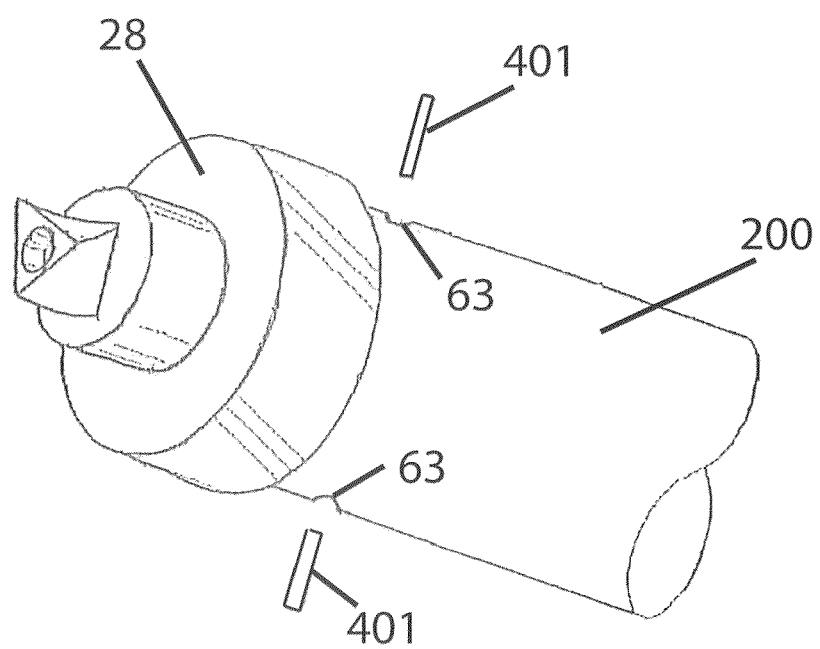
FIGS. 9a-b depict another exemplary embodiment of coupling the drive gear assembly and the new drum-cylinder.
Figure 9B:
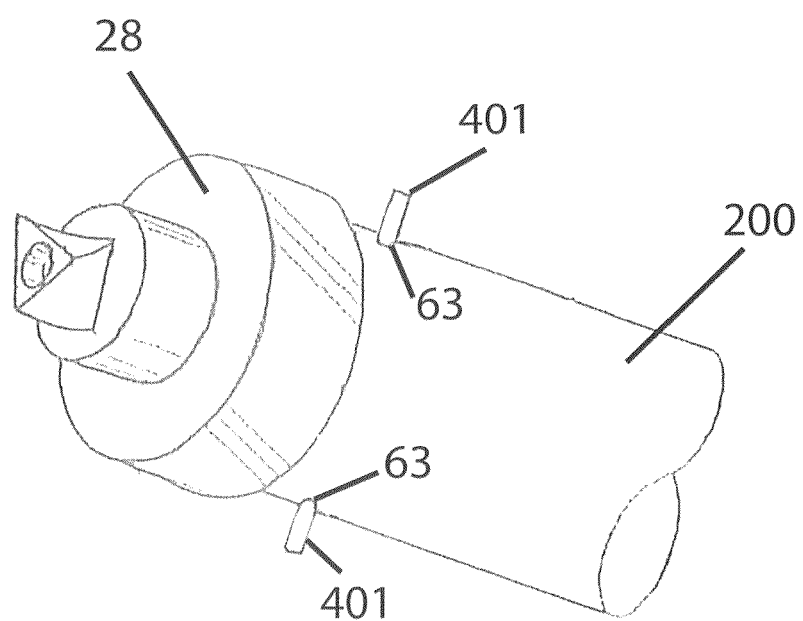

Referring to FIGS. 9a-b, in another exemplary embodiment according to the present disclosure, once the drive gear assembly 28 is inserted into the new drum-cylinder 200, one or more pins 401 may be used to prevent the drive gear assembly 28 from being removed from the new drum-cylinder 200 as the drive gear assembly 28 rotates the new drum-cylinder 200. The one or more pins 410 may be inserted into pre-existing slots 62 shown in FIG. 2 or into one or more openings 63 that may be drilled into the drive gear assembly 28 and the new drum-cylinder 200 after the drive gear assembly 28 is inserted into the new drum-cylinder 200. Although FIGS. 9a-b depict and describe the process of coupling the original drive gear assembly 28 to the new drum-cylinder 200, in another exemplary embodiment according to the present application, the one or more pins 401 may be used to couple the helical gear assembly 24 to the new drum-cylinder 200.

Figure 10A:
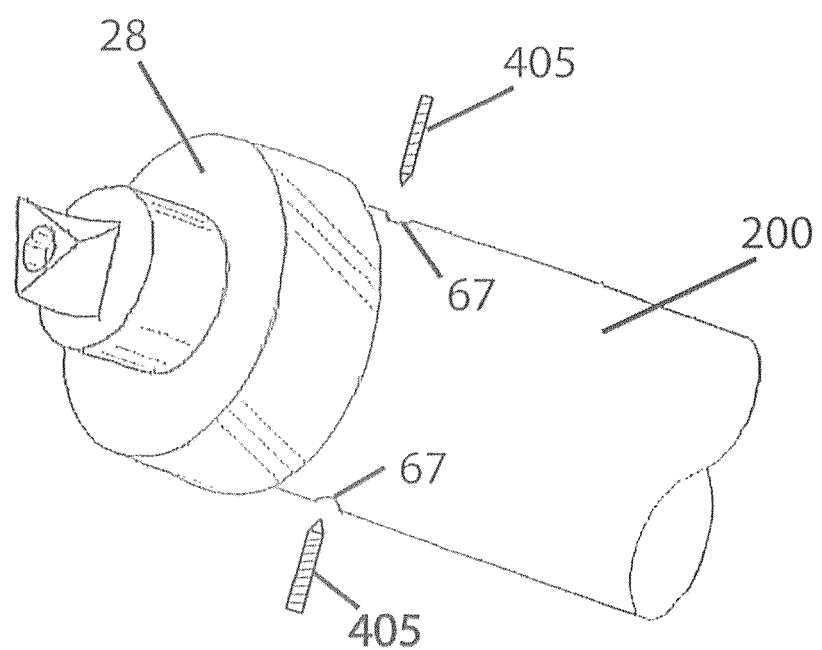
FIGS. 10a-b depict another exemplary embodiment of coupling the drive gear assembly and the new drum-cylinder.
Figure 10B:
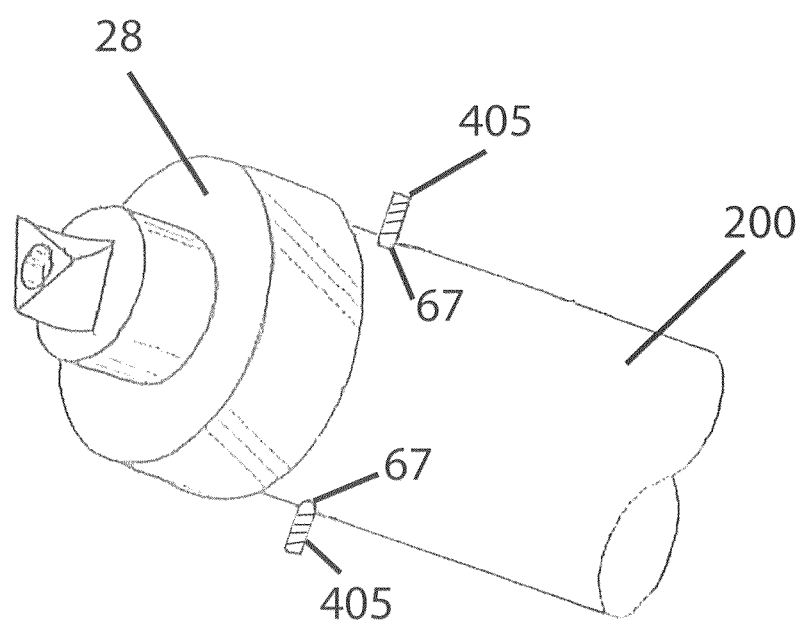

Referring to FIGS. 10a-b, in another exemplary embodiment according to the present disclosure, once the drive gear assembly 28 is inserted into the new drum-cylinder 200, one or more screws 405 may be used to prevent the drive gear assembly 28 from being removed from the new drum-cylinder 200 as the drive gear assembly 28 rotates the new drum-cylinder 200. The one or more screws 405 may be screwed through the new drum-cylinder 200 and into pre-existing slots 62 shown in FIG. 2 or the one or more screws 405 may be screwed through one or more openings 67 after the drive gear assembly 28 is inserted into the new drum-cylinder 200. The one or more openings 67 may be pre-drilled prior to insertion of the screws 405 or the one or more opening 67 may be formed as the screws 405 are being screwed into the drive gear assembly 28 through the new drum-cylinder 200. Although FIGS. 10a-b depict and describe the process of coupling the original drive gear assembly 28 to the new drum-cylinder 200, in another exemplary embodiment according to the present application, the one or more screws 405 may be used to couple the helical gear assembly 24 to the new drum-cylinder 200.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . ."

What is claimed is:

1. A method comprising:
    providing an assembly that comprises a first drum-cylinder having an inner periphery surface and a gear assembly, wherein a portion of the gear assembly is in contact with the inner periphery surface and wherein the portion of the gear assembly includes a pair of slots;
    separating the gear assembly from the first drum-cylinder;
    inserting the portion of the gear assembly into a second drum-cylinder;
    positioning the portion of the gear assembly and the second drum-cylinder between a pair of moveable arms; and
    moving the moveable arms toward the portion of the gear assembly to couple the gear assembly to the second drum-cylinder by crimping the second drum-cylinder into the pair of slots.

2. The method of claim 1, wherein the second drum-cylinder is made of aluminum.

3. The method of claim 1, wherein the second drum-cylinder is made of aluminum and has an anodized surface.

4. The method of claim 1, wherein the gear assembly is coupled to the second drum-cylinder having a torque failure value of at least 5 ft. lbs.

5. The method of claim 1, wherein the gear assembly is a drive gear assembly.

6. The method of claim 1, wherein the gear assembly is a helical gear assembly.

7. The method of claim 1, wherein positioning the portion of the gear assembly and the second drum-cylinder between a pair of moveable arms includes aligning the slots with the moveable arms.

8. A method comprising:
    providing an assembly that comprises a first drum-cylinder having an inner periphery surface and a gear assembly, wherein a portion of the gear assembly is in contact with the inner periphery surface and wherein the portion of the gear assembly includes a pair of slots;
    providing means for separating the gear assembly from the first drum-cylinder; separating the gear assembly from the first drum-cylinder;
    providing means for joining the gear assembly and a second drum-cylinder;
    joining the gear assembly and the second drum-cylinder;
    positioning the gear assembly and the second drum-cylinder between a pair of moveable arms; and
    moving the moveable arms to crimp the second drum-cylinder into the slots and thereby coupling the gear assembly to the second drum-cylinder.

9. The method of claim 8, wherein the gear assembly is a drive gear assembly.

10. The method of claim 8, wherein the gear assembly is a helical gear assembly.

* * * * *

UNITED STATES PATENT AND TRADEMARK OFFICE
CERTIFICATE OF CORRECTION

PATENT NO. : 9,146,533 B2
APPLICATION NO. : 13/079780
DATED : September 29, 2015
INVENTOR(S) : Yoel Wazana et al.

Page 1 of 1

It is certified that error appears in the above-identified patent and that said Letters Patent is hereby corrected as shown below:

In the specification,

Column 2, line 34, "perspective view of with the helical gear" should be changed to --perspective view of the helical gear--.
Column 4, line 65, "close" should be changed to --closed--.
Column 8, line 10, "exemplary" should be changed to --example--; line 27, "may also be use" should be changed to --may also be used--.

Signed and Sealed this
Sixteenth Day of February, 2016

Michelle K. Lee
*Director of the United States Patent and Trademark Office*